June 19, 1923.  1,459,068
F. KRUSE
SAUSAGE TWISTING MACHINE
Filed Jan. 13, 1923  4 Sheets-Sheet 4
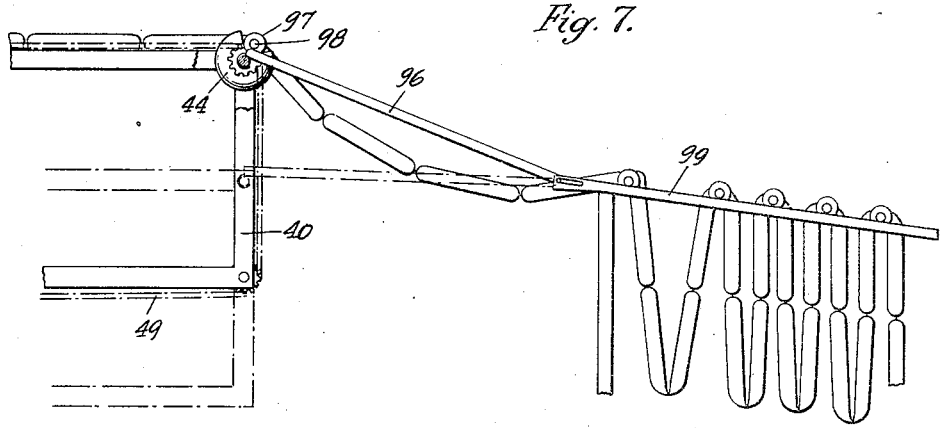
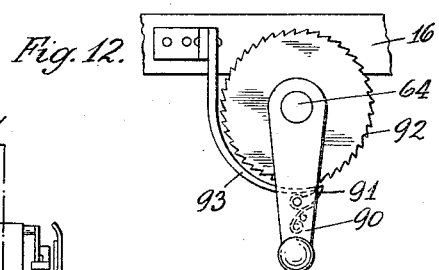
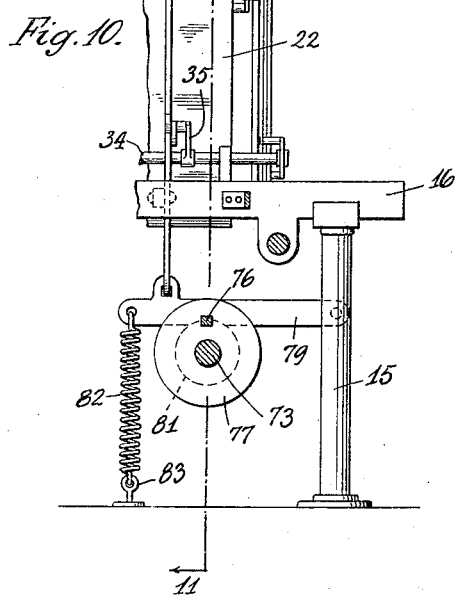
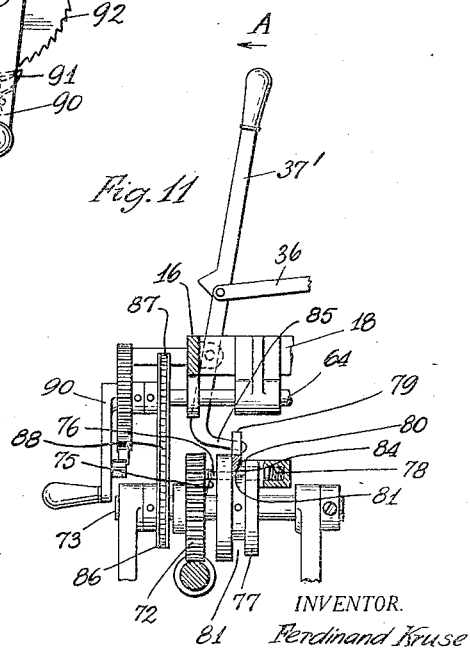
INVENTOR.
Ferdinand Kruse
BY Richards Geier
ATTORNEYS.

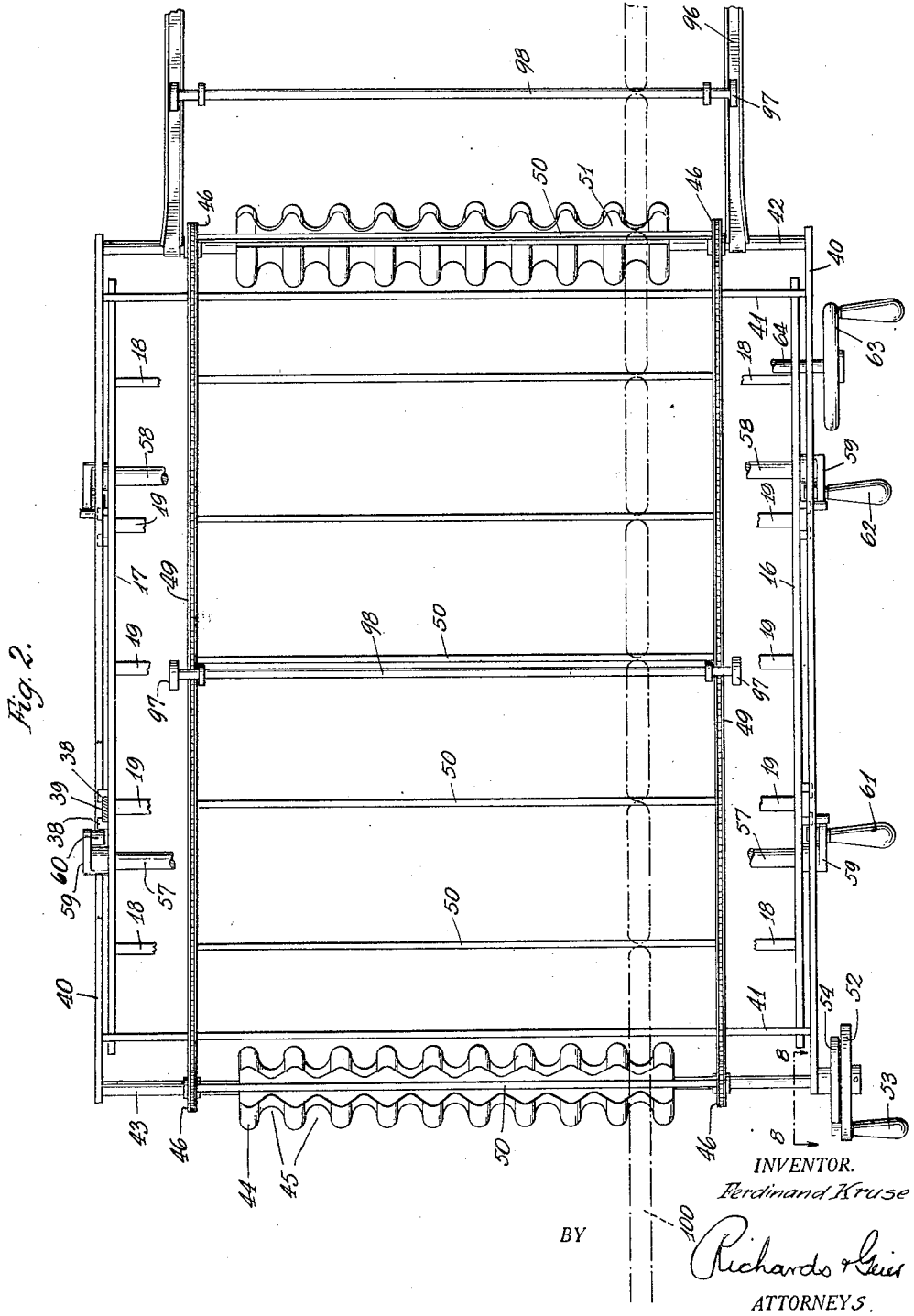

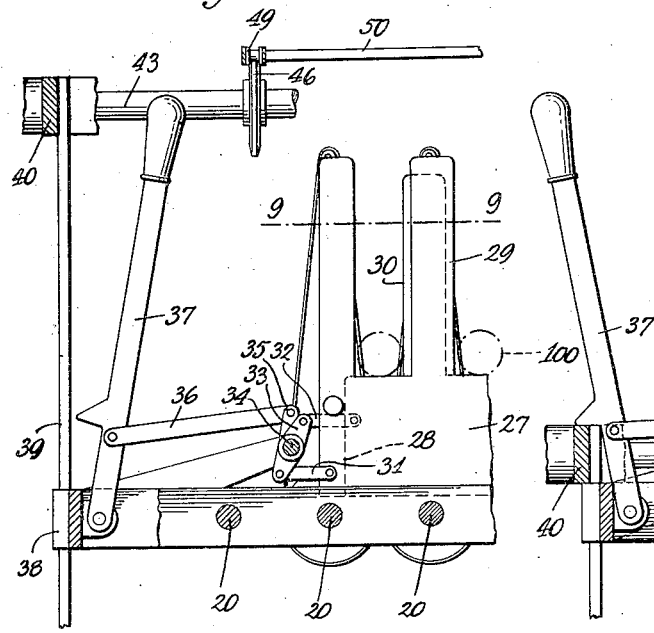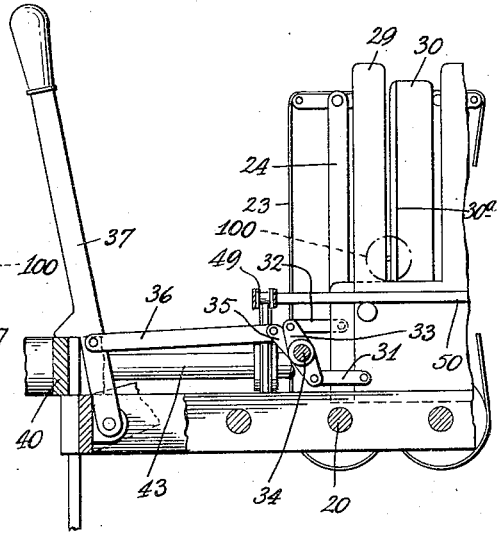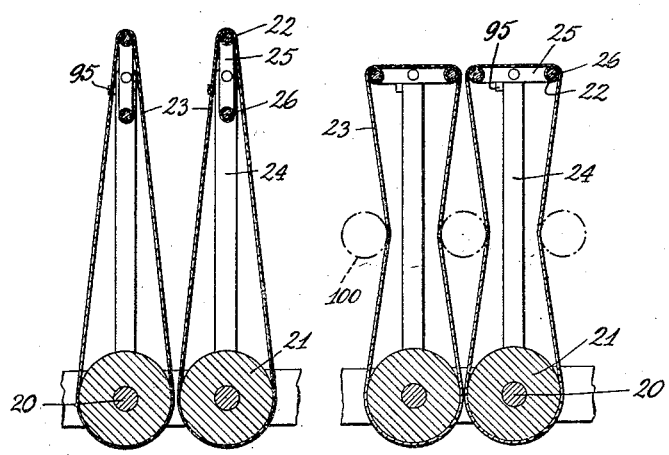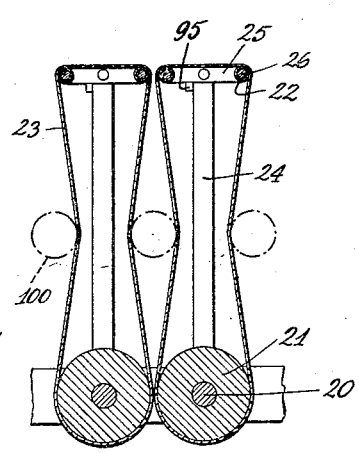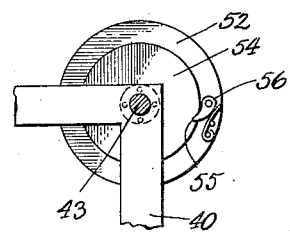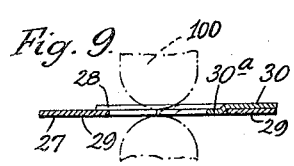
INVENTOR.
Ferdinand Kruse
ATTORNEYS.

Patented June 19, 1923.

1,459,068

UNITED STATES PATENT OFFICE.

FERDINAND KRUSE, OF NEW YORK, N. Y.

SAUSAGE-TWISTING MACHINE.

Application filed January 13, 1923. Serial No. 612,409.

*To all whom it may concern:*

Be it known that I, FERDINAND KRUSE, a citizen of the United States, residing at New York, county of New York, and State of New York, have invented certain new and useful Improvements in Sausage-Twisting Machines, of which the following is a specification.

This invention relates to sausage twisting machines of the type in which a plurality of endless belts are arranged in longitudinally aligned series of belts, the belts extending vertically and being spaced longitudinally of the machine to provide a plurality of spaces in alignment transversely of the machine, the sausage casing being threaded to and fro across the machine in these spaces and around former elements arranged at the sides of the machine, intermediate formers being provided between each adjacent longitudinal series of belts for simultaneously compressing the casings at a plurality of points while the twisting thereof is performed by the belts.

While the operation of these machines has been generally successful, some difficulty has been experienced because of the occasional failure of the machine to twist the casings at the outer rows of belts, which failure has been largely caused by the drag of the casings upon the end formers. The principal object of this invention therefore is to overcome the defects found to exist in the machines shown in my prior applications.

Another object is to provide a machine wherein a plurality of casings are simultaneously twisted to form a plurality of sausages or links at a single operation of the machine.

A further object is to provide a conveyer adapted to be intermittently operated to draw the casings through the machine.

For the accomplishment of these and such further objects as will hereinafter be apparent to those skilled in the art to which this appertains, the invention consists in the construction, combination and arrangement of parts herein specifically described and illustrated in the accompanying drawings, wherein is shown a preferred embodiment of the invention, but it is to be understood that changes, variations and modifications may be resorted to which fall within the scope of the claims hereunto appended.

In the drawings forming a portion of this specification:

Fig. 2 is a top or plan view of the machine shown in Fig. 1.

Fig. 3 is a section on the line 3—4 of Fig. 1 showing the belts and former elements in open or inoperative position.

Fig. 4 is a section similar to Fig. 3, but showing the parts in closed or operative position.

Figs. 5 and 6 are sections on the line 5—6 of Fig. 1 showing the parts in operative and inoperative positions respectively.

Fig. 7 is an end elevation of a portion of a machine showing the manner in which the linked sausages are delivered from the machine by the conveyer.

Fig. 8 is a sectional detail in the line 8—8 of Fig. 2.

Fig. 9 is a horizontal sectional detail on the line 9—9 of Fig. 3.

Fig. 10 is a partial end view of a modification of the machine showing a power drive and clutch control.

Fig. 11 is a section on the line 11—11 of Fig. 10, and

Fig. 12 is an end elevational detail of the manually operated means for reversing the belts used in conjunction with the power drive.

Figure 1:
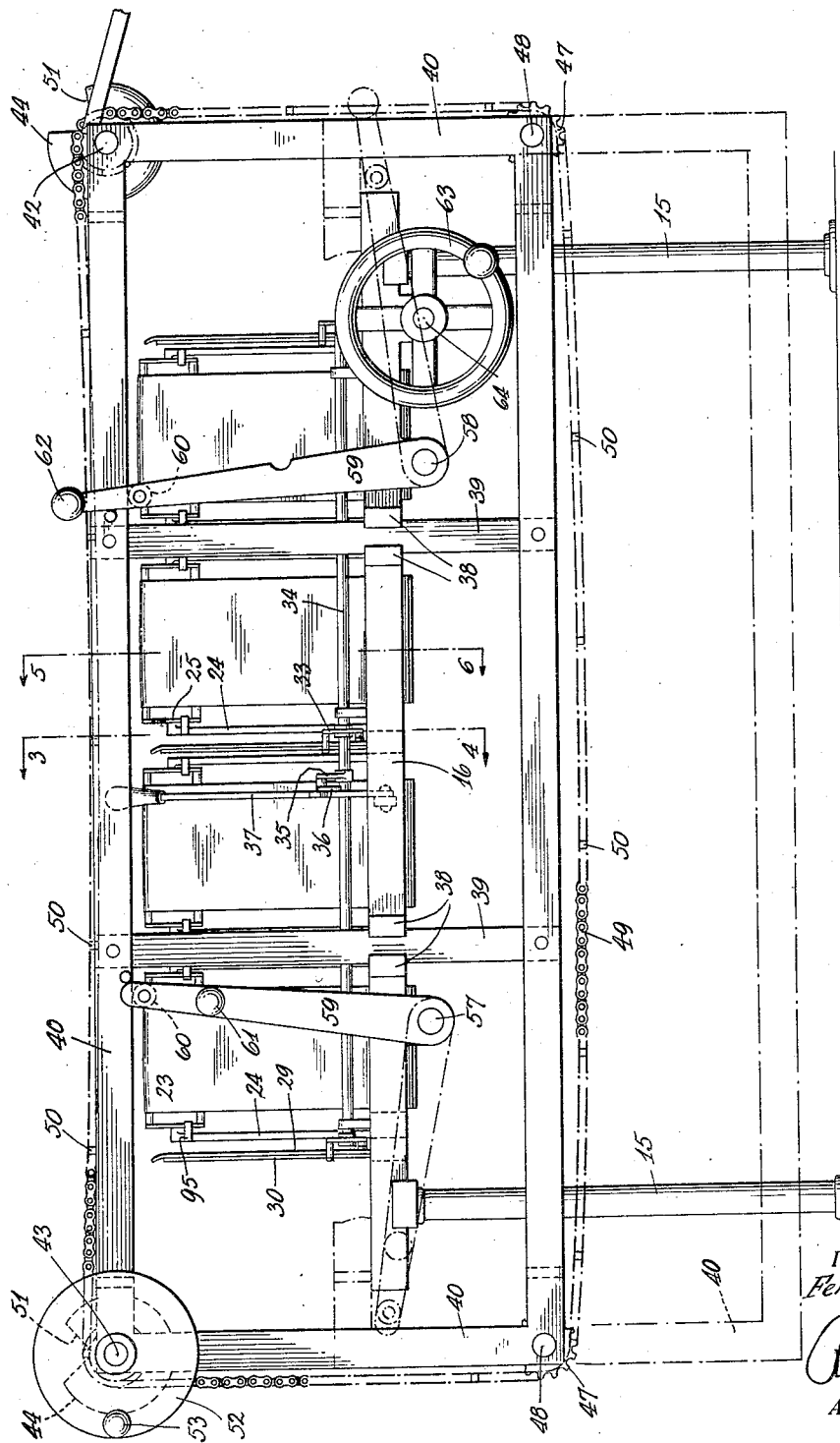
Fig. 1 is an end elevation of a sausage twisting machine.

As shown in the drawings, the main frame of the machine which is mounted upon the supports 15 consists of the end members 16 and 17 connected by the side bars 18 and a plurality of transversely spaced intermediate bars 19, which extend longitudinally of the machine. Extending transversely of the machine and journaled in the side and intermediate rods are a plurality of shafts 20 upon which are mounted the belt driving rollers 21. about which and the upper idler rolls 22 the endless twisting belts 23 are trained. The shafts 20 are spaced longitudinally of the machine to provide free or open spaces between the vertical reaches of adjacent belts and the belts and rollers are spaced transversely with the belts upon each shaft in longitudinal alignment with the belts of the adjacent shafts, thereby providing a series of longitudinally aligned rows of belts. Suitable driving gears (not shown) are provided for the driving rollers 21 so as to cause each longitudinal row of belts to be driven in an opposite direction to the belts in the adjacent row.

Secured upon the side and intermediate bars 18 and 19, in alignment with the shafts 20 are a plurality of brackets 24 upon which are pivotally mounted the bars 25 connected by shafts 26 upon which the idler rolls 22 are mounted. Slidably mounted in a suitable groove in each of the bars 18 and 19 are a pair of slides 27 and 28 having the former elements 29 and 30 respectively, projecting upwardly therefrom. The elements 30 are offset laterally as indicated at 30$^a$ in Fig. 9 to bring the working edges thereof into alignment with the working edges of the elements 29. These former elements are arranged to be normally held in alignment transversely of the machine with the brackets 24 and the slides 27 and 28 are connected by means of the links 31 and 32 respectively with oscillating levers 33 secured upon a transverse shaft 34 which has an arm 35 secured thereto. The outer end of arm is connected by a link 36 with a former actuating lever 37. The end members 16 and 17 are each provided with the guides 38 in which are slidably received the vertically extending rods 39 of a combined sausage lifting and conveyer frame which consists of a pair of rectangular shaped side frames 40, connected by the rods 41. Journalled in the side frames 40 are a pair of driving shafts 42 and 43, secured to each of which is a conveying roller 44 having a plurality of grooves 45 therein, which grooves are arranged in alignment with the free spaces between the twisting belts. Driving sprockets 46 are mounted on each of the driving shafts 42 and 43 and idler sprockets 47 are mounted on each of the shafts 48 extending between the lower corners of the frames 40. Trained about the sprockets 46 and 47 are a pair of sprocket chains 49 to which are secured, at spaced intervals equal to the distance between the bars 18 and 19, a plurality of lifting rods 50.

Each of the conveying rollers 44 has a segmental portion thereof cut away as indicated by the numeral 51 and the diameter of the conveying rollers is so proportioned as to cause the circumference of the roller to be equal to the distance between two adjacent rods 50, or a multiple thereof, so that the rods will always engage within the segmental cut out when the conveying rolls are rotated. The shaft 43 is extended beyond a frame 40 and has secured thereto a disc 52 from which an actuating handle 53 projects. Means are provided for holding the shaft 43 and thereby the sprockets and chains against accidental movement and comprises the anchor plate 54 (see Figs. 2 and 8) fixed to the side frame 40 adjacent the disc 52 and provided upon its circumference with a notch 55 with which is adapted to engage a spring pressed pawl 56 pivotally mounted on the inner face of the disc 52, the notch and pawl being so located with respect to the cut out 51 as to bring the rods 50 on the upper reach of the chains in alignment with the spaces between longitudinal rows of the belts, adjacent the bars 19 to thereby permit the lifting and conveyer frame to be lowered from the full to the dotted line position shown in Fig. 1.

Means for raising and lowering this frame consist of a pair of longitudinally extending shafts 57 and 58 journalled in the end members 16 of the main frame and which extend outwardly beyond the members 16 and 17. Secured to the outer ends of each of these shafts are the lifting members 59 each of which has a pin 60 projecting laterally therefrom to engage under the top bar of rectangular frame 40. The lifting member 60 on the end of shaft 57 adjacent the disc 52 is provided with an actuating handle 61 while the member 60 on the same end of shaft 58 is extended to form an actuating handle 62, this arrangement of the handles 61 and 62 being necessary in the construction shown to prevent obstruction of the handles by the other parts of the machine. Means for carrying the linked sausages from the machine comprise a pair of channelled runways 96 which are hooked over the shaft 42 and connect with a receiving frame 99, the runways being adapted to receive the rollers 97 of a smoke stick 98 which is manually placed upon the chains at the central portion of the machine under the casings after they have been linked.

In the modification of the machine shown in Figs. 1 to 10 inclusive, the twisting belt driving gears are manually operated by the hand wheel 63 secured to the shaft 64 upon which a plurality of gears (not shown) are secured to mesh with cooperating gears (not shown) upon the shafts 20.

Figs. 11 to 12 inclusive show a form of power drive which may, if desired, be substituted for the manual operation. This power drive comprises a continuously rotating main driving shaft 70 which may be driven from any suitable source of power and which has secured thereto a worm 71 meshing with a worm gear 72 rotatably mounted on a jack shaft 73 journalled in the bearings 74.

The worm gear 72 has a lug 75 projecting outwardly from its inner face with which is adapted to engage a pin 76 slidably mounted in a clutch member 77 which is fixed upon the jack shaft 73. Pin 76 is urged outwardly into the path of the continuously rotating lug 75 by a spring 78 and is adapted to be withdrawn out of the path of said lug by a lever 79 pivotally mounted at one end upon one of the posts 15 and having a tapered knife edged portion 80 adapted to be within a groove 81 formed in the member 77. The other end of lever 79 has secured thereto one end of a coiled contractile spring 82 whose other end is anchored as at 83. The spring 82 causes the lever 79 to be held into the groove and forces the knife edged portion 80 to engage a shoulder 84 upon pin 76 and force the pin backwardly against the action of spring 78, thus normally holding the clutch inactive. When the power drive is used with the machine the former actuating lever designated in Figs. 10 and 11 by the numeral 37' is extended downwardly below its pivotal mounting to form a hooked end 85 which engages in a suitable aperture provided in lever 79, to provide a means for controlling the clutch. The rotation of jack shaft 73 is communicated to shaft 64 through sprockets 86 and 87 mounted on shafts 73 and 64 respectively and a sprocket chain 88 trained about the sprockets. A handle 90 having a pawl 91 pivoted thereon to engage a ratchet wheel 92 secured to shaft 64 is provided for manually rotating the belts opposite to the rotation produced by the power drive and a pawl releasing arm 93 is provided to prevent engagement of the pawl and rotation of the handle 90 by the rotation of the power drive.

The operation of the machine shown in Figs. 1 to 10 is as follows, assuming that the combined lifting and conveying frame to be in the full line position shown in Fig. 1 and that the belts 23 are in the position shown in Figs. 3 and 5, a plurality of sausage casings 100 are placed across the machine to lie in the grooves 45 of the conveying rollers 44 with the casings extending in straight lines across the machine and resting upon the rods 50. The handles 61 and 62 are grasped to lower the combined lifting and conveyer frame and the casings are lowered into the free spaces between the belts which are in the open position shown in Fig. 5, the former elements being in the position shown in Fig. 3. After the lifting frame is lowered the casings will lie substantially in the position shown in Fig. 3. Lever 37 is then actuated to close the former elements to the position shown in Fig. 4 thus compressing the casings at the selected points. Handle 63 is then rotated to drive the twisting belts 23. The rotation of the driving belts will cause the idler rolls 22 to be moved by the friction of the belts upon the bars 26, from the position shown in Fig. 5 to that shown in Fig. 6, thus closing the belts upon the casings. The rotation of the handle is continued for a sufficient length of time to give about three twists to the casings which is usually sufficient. After the twisting of the casings is completed the handle 63 is given a slight reverse rotation thereby causing the friction of the belts to move the idler rolls back to the position shown in Fig. 5, suitable stops 95 being provided to limit the movement of the idler roll frames. The lever 37 is then actuated to open the former elements and the handles 61 and 62 are actuated to raise the lifting and conveying frame to the full line position shown in Fig. 1, after which a smoke stick is placed upon the chains 49 at the central portion thereof as shown in Fig. 2 and underneath the linked casings. The conveying chains 49 are then moved by the handle 53 and associated parts to carry the linked sausages through the machine, the rollers 97 entering the channelled runways 96 and carrying the linked sausages to the receiving frame 99. The movement of the conveyer is continued to carry the last linked sausage beyond the side of the frame and the unlinked portion of the casings into the machine. A table is placed adjacent the receiving side of the machine to hold the unlinked casings which are extended along the table in parallel spaced lines to allow the casings to pass readily into the grooves 45 of the adjacent conveying roll 44. In the modification shown in Figs. 10 to 12 inclusive, when it is desired to rotate the belts the handle 37' is pulled to the left as indicated by the arrow A, thus causing the lever 79 to be raised against the action of spring 82, knife edge 80 being lifted out of contact with pin 76, which is urged by spring 78 outwardly to be engaged by the continuously rotating worm wheel 72, lug 75 engaging pin 76 and thereby causing rotation of jack shaft 73 by clutch 77. The rotation of jack shaft 73 causes the belts 22 to be rotated through the sprockets 86, 87, chain 88 and shaft 64 which is connected by suitable gearing to the shafts 20. The movement of handle 37' to operate the clutch also moves the former elements to the closed position through the parts 31 to 36 inclusive. It is only necessary to merely move the handle to the limit of its movement in the direction of the arrow after which the handle is released, the spring 82 causing the handle to be moved in the reverse direction, thus opening the former elements, and the knife edge 80 being held against the bottom of groove 81 to again engage the pin 76 and release the clutch when a complete rotation of jack shaft 73 has been made. After the clutch is released, the handle 90 is actuated in the counter clockwise direction (Fig. 12) to rotate the belts 23 a sufficient distance in the reverse direction to that imparted to the belts by the power drive, whereby the friction of the belts upon the bars will cause the idler roll frames to move to the position shown in Fig. 5 and open the belts. The operation of the lifting and conveying frame is the same as that heretofore described.

It will be noted that with the power drive form of the machine the former elements are only closed momentarily and that the twisting is continued after the former elements are opened.

I claim—

1. A sausage twisting machine having a plurality of longitudinally extending rows of vertically extending endless twisting belts having their opposed vertical reaches spaced longitudinally of the machine to form a plurality of parallel free spaces extending transversely of the machine in which a plurality of sausage casings may be received, means to rotate said belts, means to cause the vertical reaches of adjacent belts to be moved to and from each other by the travel of said belts in opposite directions and a plurality of cooperating pairs of former elements slidable longitudinally of said machine adapted to compress said plurality of casings at predetermined points, means for lifting said casings from between said belts and conveying the casings through the machine.

2. A sausage twisting machine having a plurality of longitudinally extending rows of vertically extending endless twisting belts having their opposed vertical reaches spaced longitudinally of the machine to form a plurality of parallel free spaces extending transversely of the machine in which a plurality of sausage casings may be received, means to rotate said belts, means to cause the vertical reaches of adjacent belts to be moved to and from each other by the travel of said belts in opposite directions and a plurality of cooperating pairs of former elements slidable longitudinally of said machine adapted to compress said plurality of casings at predetermined points, a lifting frame for lifting said casings from between said belts and an endless conveyor mounted on said lifting frame.

3. A sausage twisting machine having a plurality of longitudinally extending rows of vertically extending endless twisting belts having their opposed vertical reaches spaced longitudinally of the machine to form a plurality of parallel free spaces extending transversely of the machine in which a plurality of sausage casings may be received means to rotate said belts, means to cause the vertical reaches of adjacent belts to be moved to and from each other by the travel of said belts in opposite directions and a plurality of cooperating pairs of former elements slidable longitudinally of said machine adapted to compress said plurality of casings at predetermined points, a lifting frame for lifting said casings from between said belts and an endless conveyer mounted on said lifting frame, and a pair of guide rollers arranged one on each side of said machine and having a plurality of grooves therein in alignment with the free spaces between said belts.

4. A sausage twisting machine as set forth in claim 2 in which said conveyer consists of a pair of endless chains, a plurality of rods extending between said chains, said rods being secured to said chains at spaced intervals equal to the length of the links formed by said former elements.

5. A sausage twisting machine as set forth in claim 4 in which a pair of guide rollers are located one on each side of said machine and are driven by said chains.

6. A sausage twisting machine as set forth in claim 5, in which said guide rollers are provided with a plurality of grooves in alignment with the free spaces between the vertical reaches of said belts.

7. A sausage twisting machine as set forth in claim 5 in which said guide rollers are provided with a longitudinally extending cut out portion to permit the passage of said rods about said rollers.

8. A sausage twisting machine as set forth in claim 7, in which the circumference of said guide rollers is equal to or a multiple of the distance between two adjacent rods of said conveyer.

9. A sausage twisting machine as set forth in claim 8, in which means are provided to prevent accidental movement of said conveyer.

10. A sausage twisting machine as set forth in claim 2 in combination with a smoke stick adapted to be placed upon said conveyer, and a runway adjacent the delivery end of said conveyer to which said smoke stick is delivered by said conveyer.

11. A sausage twisting machine as set forth in claim 2, in combination with a pair of channeled runways adjacent the delivery end of said conveyer, and a smoke stick provided with a pair of rollers at its extremities said smoke stick adapted to be placed upon said conveyer in engagement with the sausage casings and to be delivered by said conveyer to said runways to carry said casings from said machine.

In testimony whereof I have affixed my signature.

FERDINAND KRUSE.